United States Patent
Okada et al.

(10) Patent No.: US 8,441,171 B2
(45) Date of Patent: May 14, 2013

(54) MOTOR DEVICE, METHOD OF MANUFACTURING MOTOR DEVICE, AND ROBOT DEVICE

(75) Inventors: Masashi Okada, Yotsukaido (JP); Akimitsu Ebihara, Sennan-gun (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/064,544

(22) Filed: Mar. 30, 2011

(65) Prior Publication Data

US 2011/0241484 A1    Oct. 6, 2011

Related U.S. Application Data

(60) Provisional application No. 61/406,345, filed on Oct. 25, 2010.

(30) Foreign Application Priority Data

Mar. 31, 2010    (JP) ................................ P2010-083378

(51) Int. Cl.
    *H02N 2/00*    (2006.01)
    *H01L 41/09*   (2006.01)

(52) U.S. Cl.
    USPC ................. 310/328; 310/323.01; 310/323.02; 310/323.17

(58) Field of Classification Search ............................. 310/323.01–323.19, 328
    See application file for complete search history.

(56) References Cited

U.S. PATENT DOCUMENTS

| | | | |
|---|---|---|---|
| 4,019,073 A * | 4/1977 | Vishnevsky et al. | 310/322 |
| 5,406,160 A * | 4/1995 | Shirasaki | 310/323.06 |
| 5,712,524 A * | 1/1998 | Suga | 310/328 |
| 7,339,306 B2 * | 3/2008 | Henderson | 310/323.02 |
| 7,429,812 B2 * | 9/2008 | Witteveen et al. | 310/323.01 |
| 7,834,516 B2 * | 11/2010 | Kang et al. | 310/323.01 |
| 2007/0164635 A1 | 7/2007 | Witteveen et al. | |
| 2008/0247059 A1 * | 10/2008 | Dong | 359/696 |
| 2008/0297001 A1 * | 12/2008 | Wischnewskij et al. | 310/323.06 |
| 2010/0084944 A1 * | 4/2010 | Suzuki | 310/323.02 |
| 2010/0127598 A1 * | 5/2010 | Sun et al. | 310/323.02 |
| 2010/0164326 A1 * | 7/2010 | Ebihara | 310/323.02 |
| 2010/0295418 A1 * | 11/2010 | Blume et al. | 310/323.02 |
| 2011/0241485 A1 * | 10/2011 | Nagase et al. | 310/323.02 |
| 2011/0266920 A1 * | 11/2011 | Blume et al. | 310/323.02 |

FOREIGN PATENT DOCUMENTS

| | | |
|---|---|---|
| DE | 102007-23200 | * 11/2008 |
| JP | 2-311237 | 12/1990 |
| JP | 2008-220171 | 9/2008 |

OTHER PUBLICATIONS

International Search Report issued Jun. 28, 2011 in corresponding International Patent Application PCT/JP2011/057547.

Written Opinion issued Jun. 28, 2011 in corresponding International Patent Application PCT/JP2011/057547.

* cited by examiner

*Primary Examiner* — Thomas Dougherty

(57) ABSTRACT

A motor device comprises a transmission substrate formed with a transmission portion that is wound around at least part of the outer periphery of a rotator; and a driving substrate that has a driving portion which moves the transmission portion by a certain distance in a state in which a rotational force is transmitted between the rotator and the transmission portion returns the transmission portion to a predetermined position in a state in which the rotation force transmission state is released, and is connected to the transmission substrate so that the driving force due to the driving portion acts on the transmission portion.

22 Claims, 14 Drawing Sheets

MOTOR DEVICE, METHOD OF MANUFACTURING MOTOR DEVICE, AND ROBOT DEVICE

CROSS-REFERENCE TO RELATED APPLICATION

This application is a non-provisional application claiming priority to and the benefit of U.S. provisional application No. 61/406,345, filed Oct. 25, 2010 and Japanese Patent Application No. 2010-083378, filed Mar. 31, 2010. The entire contents of which are incorporated herein by reference.

FIELD OF THE INVENTION

The present invention relates to a motor device, a method of manufacturing the same, and a robot device.

DESCRIPTION OF THE RELATED ART

As, for example, an actuator that drives an evolution system machine, a motor device is used. As such a motor device, an electric motor or an ultrasonic wave motor is widely known that is capable of generating high torque (for example, see JP-A-H2-311237). Recently, there is a need for a motor device that drives a higher precision portion such as a joint of a humanoid robot, and there is a need for a configuration that can provide miniaturization and controllability of torque and can perform detailed high precision driving even in existing motors such as the electric motor or the ultrasonic wave motor.

However, in the electric motor or the ultrasonic motor, since there is a need to attach a reduction gear so as to generate high torque, there is a limitation on the miniaturization. Furthermore, in the ultrasonic motor, the control of torque is difficult.

An object of aspects according to the present invention is to provide a motor device capable of generating high torque.

SUMMARY

A motor device according to an aspect of the present invention comprises a transmission substrate formed with a transmission portion that is wound around at least part of the outer periphery of a rotator; and a driving substrate that has a driving portion which moves the transmission portion by a certain distance in a state in which a rotational force is transmitted between the rotator and the transmission portion and returns the transmission portion to a predetermined position in a state in which the rotation force transmission state is released, and is connected to the transmission substrate so that the driving force due to the driving portion acts on the transmission portion.

A motor device comprises a transmission substrate formed with a transmission portion that is wound around at least part of a rotator; a driving substrate that has a driving portion which moves the transmission portion by a certain distance in a state in which a rotational force is transmitted between the rotator and the transmission portion and returns the transmission portion to a predetermined position in a state in which the rotation force transmission state is released; and an opening portion formed on the transmission substrate so that the driving force of the driving portion acts on the transmission portion.

A method of manufacturing a motor device according to an aspect of the present invention comprises the steps of: forming a transmission substrate having a transmission portion that is wound around at least part of the outer periphery of a rotator; attaching a driving portion, which moves the transmission portion by a certain distance by setting a portion between the rotator and the transmission in a rotation force transmission state and returns the transmission portion to a predetermined position in a state in which the rotation transmission state is released, to a base portion to form a driving substrate; and connecting the transmission substrate and the driving substrate so that the driving force due to the driving portion acts on the transmission portion.

A method of manufacturing a motor device comprises forming a transmission portion that is wound around at least part of a rotator on a transmission substrate; forming a driving base portion in which a driving portion that moves the transmission portion is arranged on a driving substrate; and forming portions that connect between the transmission substrate and the driving substrate thereon.

A robot device according to an aspect of the present invention comprises a rotation shaft member and a motor device for rotating the rotation shaft member and in which the motor device of the present invention is used as a motor device.

According to the aspects of the present invention, it is possible to provide a motor device that can generate a high torque.

DESCRIPTION

[First Embodiment]

Hereinafter, a first embodiment according to the present invention will be described based on the drawings.

Figure 1:
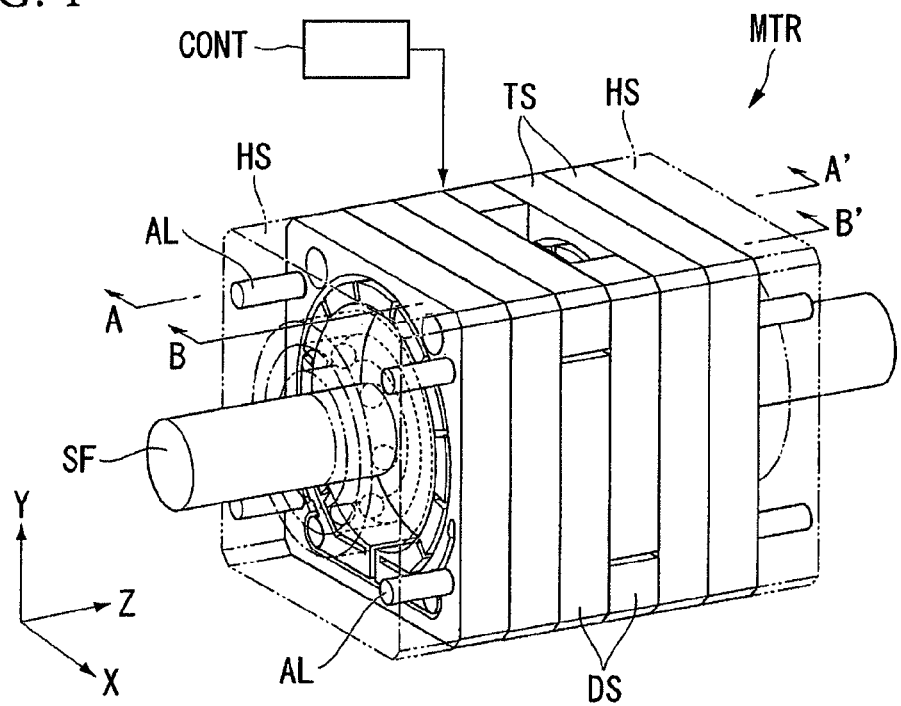
FIG. 1 is a diagram that shows a configuration of a motor device according to a first embodiment of the present invention.
Figure 2:
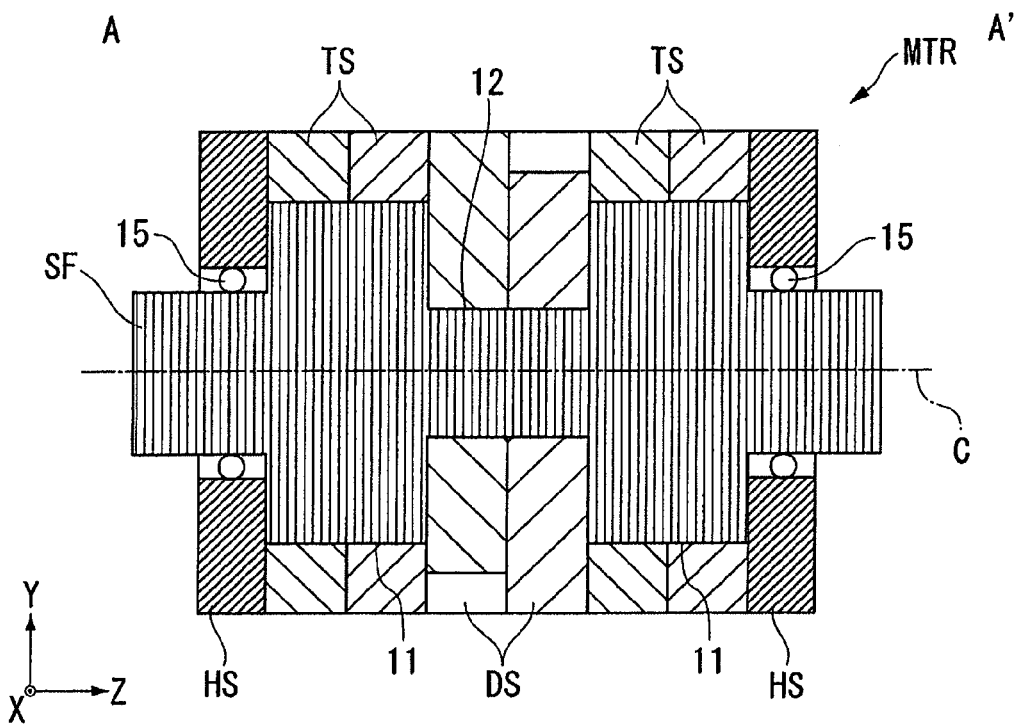
FIG. 2 is a cross-section diagram that shows a configuration of a motor device according to the present embodiment.

FIG. 1 is a schematic configuration diagram that shows an example of a motor device MTR according to the present embodiment. FIG. 2 is a diagram that shows a configuration taken along section A-A' in FIG. 1.

As shown in FIGS. 1 and 2, the motor device MTR has a rotator SF, a transmission substrate TS that transmits a rotational driving force to the rotator SF, a driving substrate DS that generates the rotational driving force, a holding substrate HS that holds the transmission substrate TS and the driving substrate DS, and a control device CONT that controls the rotational driving using the driving substrate DS. The motor device MTR has a configuration in which the transmission substrate TS, the driving substrate DS and the holding substrate HS are attached to the rotator SF. The rotator SF is formed in, for example, a cylindrical shape.

Hereinafter, in the descriptions of the drawings, an XYZ orthogonal coordinate system is set, and the positional relationship of respective members will be described while referring to the XYZ orthogonal coordinate system. The cylindrical axis direction of the rotator SF is the Z axis direction, coordinate directions on a plane perpendicular to the Z axis direction are the X axis direction and the Y axis direction. Furthermore, rotation (slope) directions around the X axis, Y axis and Z axis are θX, θY and θZ directions, respectively.

In substantially a center portion of the rotator SF in the Z axis, two driving substrates DS are disposed, for example, in an overlapped manner. At both sides of the two driving substrates DS in the Z axis direction (+Z side and −Z side), for example, transmission substrates TS are disposed two by two in an overlapping manner. Two driving substrates DS and four transmission substrates TS are in contact with each other in the Z axis direction, and connected to each other by a substrate positioning member (a substrate positioning portion) AL.

Part of the substrate positioning member AL protrudes in the +Z direction and the −Z direction of the connector, and the holding substrate HS is connected to the protrusion portion. In this manner, the connector of the driving substrate DS and the transmission substrate TS, which are provided integrally, have a configuration that is interposed by a pair of holding substrates HS. The holding substrate HS functions as a stopper that holds the driving substrate DS and the transmission substrate TS so as not to deviate in the Z axis direction. The holding substrate HS supports the rotator SF in a rotatable manner, for example, via a bearing mechanism 15.

As shown in FIG. 2, the rotator SF has an enlarged diameter portion 11 in a portion surrounded by the transmission substrate TS, and a reduced diameter portion 12 in a portion surrounded by the driving substrate DS. The enlarged diameter portion 11 is a portion having a diameter larger than, for example, a portion that is supported by the holding substrate HS. The reduced diameter portion 12 is a portion having a diameter smaller than, for example, a portion that is supported by the holding substrate HS. The rotator SF has a common rotational axis C in a portion including the enlarged diameter portion 11 and the reduced diameter portion 12.

Figure 3:
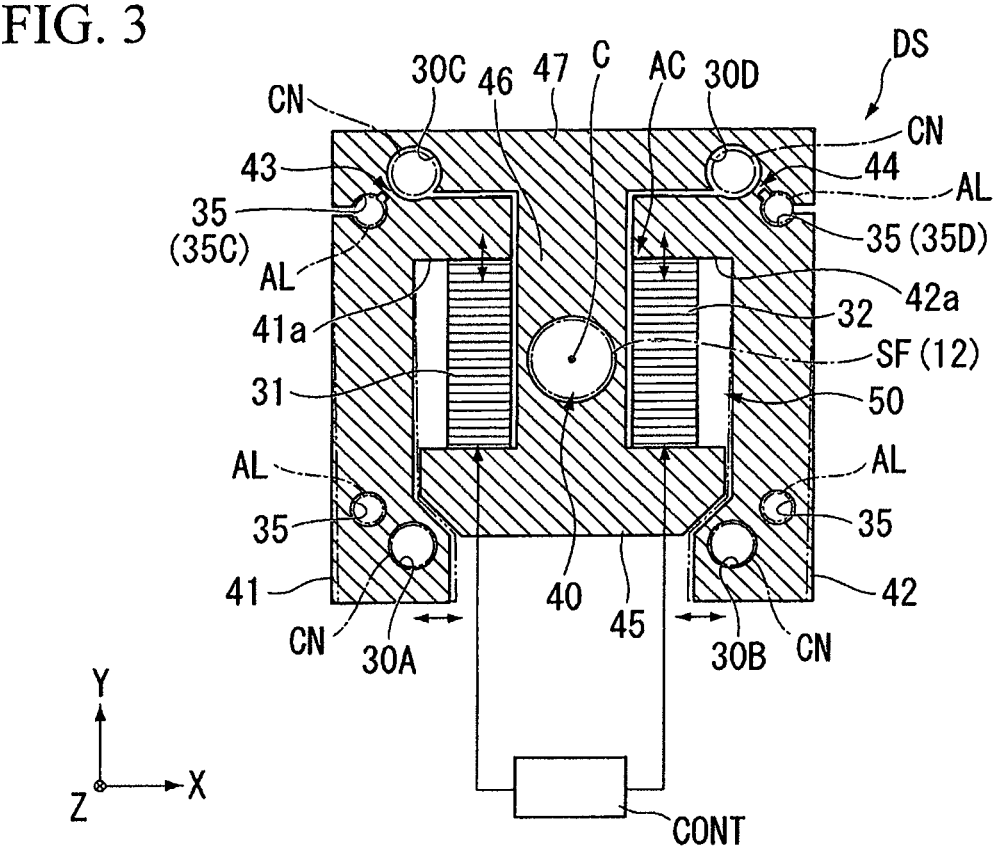
FIG. 3 is a diagram that shows a configuration of a driving substrate of a motor device according to the present embodiment.

FIG. 3 is a plan view that shows a configuration of the driving substrate DS.

The driving substrate DS is formed in a rectangular plate shape using a material such as, for example, stainless steel. The driving substrate DS has a support portion 47 in an end portion of the +Y direction in FIG. 3. In a center portion of the support portion 47 in the X direction, a connection portion 46 is formed so as to extend in the −Y direction, and in a front end of the connection portion 46 in the −Y direction, a driving base portion 45 is formed. A driving portion AC is held in the driving base portion 45.

The driving portion AC has a driving element (a first electromechanical conversion element) 31 and a driving element (a second electromechanical conversion element) 32. Each driving element includes an electromechanical conversion element such as, for example, a piezo element. The driving elements 31 and 32 have a configuration which expands and contracts in the Y direction by the application of the voltage to the electromechanical conversion element. The control device CONT is connected to the driving portion AC and is adapted to be able to supply the control signal to the driving portion AC.

The driving elements 31 and 32 are held in positions separated from a penetration portion (a second penetration portion) 40 by the driving base portion 45. The penetration portion 40 and the driving elements 31 and 32 are separated from each other, for example, via the connection portion 46. The driving elements 31 and 32 are disposed in target positions with respect to the penetration portion 40 in the X direction. The driving elements 31 and 32 are held at the end portions of the −Y side thereof. Since the positions of the Y direction of the −Y side end portion of the driving elements 31 and 32 are fixed, the +Y side end is moved in the Y direction when expanding and contracting. The end portion of the +Y side of the driving element 31 is connected to a connection surface 41a of a movable portion 41. Furthermore, the end portion of the +Y side of the driving element 32 is connected to a connection surface 42a of a movable portion 42. The driving elements 31 and 32 expand and contract, whereby a pressing force is added to the +Y side with respect to the connection surface 41a and the connection surface 42a or a force pulling is added to the −Y side with respect to the connection surface 41a and the connection surface 42a.

In the connection portion 46 of the driving substrate DS, a penetration portion 40 is formed in substantially a center portion when seen in the Z direction. The penetration portion 40 is an opening portion which is formed in substantially a circular shape when seen in Z direction, and is formed so as to penetrate both sides of the driving substrate DS. The reduced diameter portion 12 of the rotator SF is inserted into the penetration portion 40. In the driving substrate DS, aside from the penetration portion 40, for example, opening portions 30A to 30D and an opening portion 35 are formed.

The opening portions 30A to 30D are provided in four angular portions of the driving substrate DS, and are formed, for example, in a circular shape. Connection members CN are inserted into the opening portions 30A to 30D. Opening portions 35 are disposed, for example, in each of four angular portions of the driving substrate DS. For example, substrate positioning members AL are inserted into respective opening portions 35.

Among the four opening portions 35, an opening portion 35C and an opening portion 35D, which are disposed, for example, in two angular portions in the +Y side of the driving substrate DS, have protrusion portions toward the opening portions 30C and 30D, respectively. Furthermore, a cutting portion reaching a circumference of the −X side is formed in the opening portion 35C, and a cutting portion reaching a circumference of +X side is formed in the opening portion 35D.

For this reason, for example, the movable portion 41 is supported in a support portion 47 by a support portion 43 between the opening portion 35C and the opening portion 30C. Similarly, the movable portion 42 is supported in the support portion 47 by a support portion 44 between the opening portion 35D and the opening portion 30D. By this configuration, the movable portion 41 can rotate around the support portion 43 in a θZ direction, and the movable portion 42 can rotate around the support portion 44 in the θZ direction.

Figure 4:
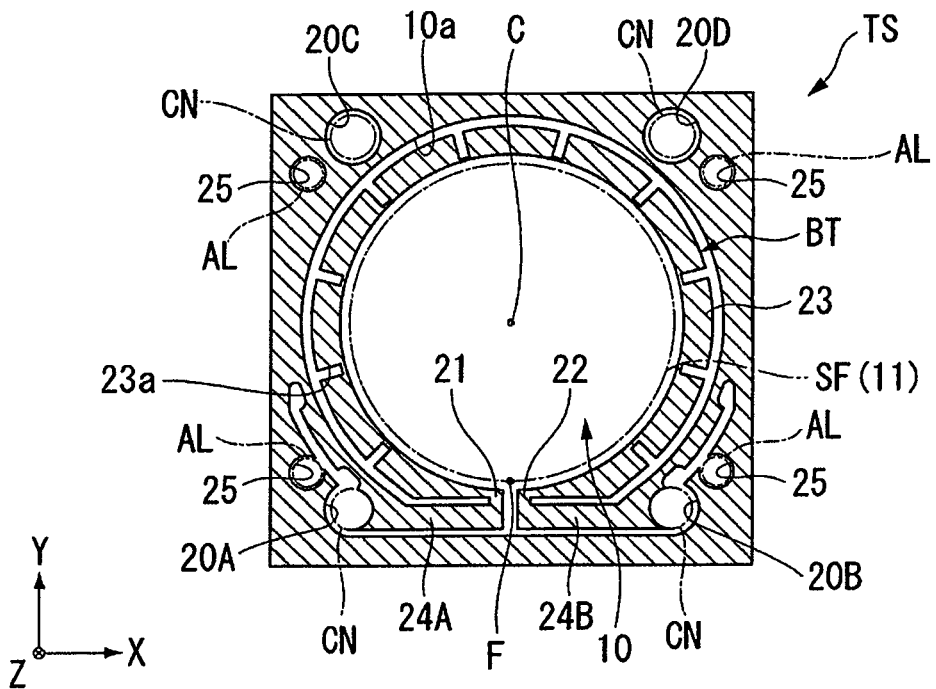
FIG. 4 is a diagram that shows a configuration of a transmission substrate of a motor device according to the present embodiment.

FIG. 4 is a plan view that shows a configuration of the transmission substrate TS.

The transmission substrate TS is formed in a rectangular plate shape using a material such as, for example, stainless steel. In the transmission substrate TS, a penetration portion (a first penetration portion) 10 is formed in substantially a center portion when seen in the Z direction. The penetration portion 10 is an opening portion which is formed in substantially a circular shape when seen in the Z direction, and is formed so as to penetrate both sides of the transmission substrate TS. The enlarged diameter portion 11 of the rotator SF is inserted into the penetration portion 10. In the transmission substrate TS, aside from the penetration portion 10, for example, opening portions 20A to 20D, a transmission portion BT, connection portions 24A and 24B, and an opening portion 25 are formed.

The opening portions 20A to 20D are each provided in four angular portions of the transmission substrate TS, and are each formed in, for example, a circular shape. The connection members CN are inserted into the opening portions 20A to 20D. For example, the same connection members CN are inserted into the opening portion 20A and the opening portion 30A of the driving substrate DS. Furthermore, the same connection members CN are inserted into the opening portion 20B and the opening portion 30B.

The transmission portion BT has a belt portion 23, a first end portion 21, and a second end portion 22.

The belt portion 23 is formed, for example, in a band shape along a wall portion (an inner peripheral portion) 10a formed by the penetration portion 10, and is formed to have a thickness to an extent that it is capable of being elastically deformed. The belt portion 23 is disposed so as to surround the rotator SF inserted into the penetration portion 10. In other words, the rotator SF is inserted into a space surrounded by the belt portion 23 of the penetration portion 10. The belt portion 23 can be wound, for example, around at least part of the rotator SF.

Multiple cutting portions 23a are formed in the belt portion 23. The cutting portions 23a are formed in, for example, an outer peripheral surface (a surface facing the inner peripheral portion 10a) of the belt portion 23. The cutting portions 23a are formed, for example, over the entire longitudinal direction (a direction along the inner peripheral portion 10a) of the belt portion 23 at substantially equal intervals. The cutting portions 23a facilitate the deformation or the movement of the belt portion 23 in a circumferential direction of the rotator SF.

The first end portion 21 of the belt portion 23 is connected to the opening portion 20A via the connection portion 24A. The connection portion 24A extends to the opening portion 20A in the +X direction, further extends to the +Y direction at the −X side position than the center portion of the transmission substrate TS in the X direction and is connected (continuing) to the first end portion 21. The second end portion 22 of the belt portion 23 is connected to the opening portion 20B via the connection portion 24B. The connection portion 24B extends to the opening portion 20B in the −X direction, further extends to the +Y direction at the −X side position than the center portion of the transmission substrate TS in the X direction and is connected (continuing) to the second end portion 22.

The first end portion 21 and the second end portion 22 are disposed so as to interpose a standard position F on the outer periphery of the rotator SF therebetween. In the present embodiment, there is a configuration in which, for example, the −Y side end portion of the rotator SF in FIG. 1 is the standard position F. Furthermore, the opening portions 20A and 20B are provided in positions where the first end portion 21, the second end portion 22 and the standard position F are interposed therebetween. For this reason, the connection members CN are connected to the transmission substrate TS in the position where the first end portion 21, the second end portion 22 and the standard position F are interposed therebetween.

The opening portions 20C and 20D are formed to have diameters larger than the opening portions 20A and 20B. For this reason, the connection members CN inserted into the opening portions 20C and 20D can be moved within the opening portions 20C and 20D without applying the pressing force to the transmission substrate TS. For example, opening portions 25 are one by one disposed in the four angular portions of the transmission substrate TS. For example, the positioning member AL is inserted into the opening portions 25.

In the driving substrate DS shown in FIG. 3, when the driving elements 31 and 32 are deformed in the stretching direction, the +Y side end portions of the driving elements 31 and 32 are moved to the +Y side thereof, and the connection surfaces 41a and 42a are pressed in the +Y direction. Due to the pressing force, the movable portion 41 is rotated in the θZ direction (a direction of counterclockwise rotation of FIG. 3) around the support portion 43, and the position of the opening portion 30A provided in the movable portion 41 is moved in the +X direction. Thus, the connection member CN inserted into the opening portion 30A is moved in the +X direction. Furthermore, the movable portion 42 is rotated in the θZ direction (the direction of counterclockwise rotation of FIG. 3) around the support portion 44, and the position of the opening portion 30B provided in the movable portion 42 is moved in the −X direction. Thus, the connection member CN to be inserted in the opening portion 30B is moved in the −X direction.

Furthermore, when the driving elements 31 and 32 are deformed in the reduction direction, the respective +Y side end portions of the driving elements 31 and 32 are moved in the −Y side thereof, and the connection surfaces 41a and 42a are pulled in the −Y direction. By the force of the pulling, the movable portion 41 is rotated in the θZ direction (the direction of clockwise rotation of FIG. 3) around the support portion 43, and the position of the opening portion 30A provided in the movable portion 41 is moved in the −X direction. Thus, the connection member CN inserted into the opening portion 30A is moved in the −X direction. Furthermore, the movable portion 42 is rotated in the θZ direction (the direction of counterclockwise rotation of FIG. 3) around the support portion 44, and the position of the opening portion 30B provided in the movable portion 42 is moved in the +X direction. Thus, the connection member CN to be inserted in the opening portion 30B is moved in the +X direction.

Furthermore, in the transmission substrate TS shown in FIG. 4, for example, when the connection member CN inserted into the opening portion 20A is moved in the +X direction, the connection portion 24A is pushed to the connection member CN and is moved in the +X direction. When the connection portion 24A is moved in the +X direction, the first end portion 21 is moved in the +X direction along with the movement. Furthermore, when the connection member CN inserted into the opening portion 20A is moved in the −X direction, the connection portion 24A is pulled to the connection member CN and is moved in the −X direction. When the connection portion 24A is moved in the −X direction, the first end portion 21 is moved in the −X direction along with the movement.

When the connection member CN inserted into opening portion 20B is moved in the −X direction, the connection portion 24B is pushed to the connection member CN and is moved in the −X direction. When the connection portion 24B is moved in the −X direction, the second end portion 22 is moved in the −X direction along with the movement. Furthermore, when the connection member CN inserted into the opening portion 20B is moved in the +X direction, the connection portion 24B is pulled to the connection member CN and is moved in the +X direction. When the connection portion 24B is moved in the +X direction, the second end portion 22 is moved in the +X direction along with the movement.

Thus, for example, when the driving elements 31 and 32 are stretched, the first end portion 21 and the second end portion 22 approach each other. For this reason, the belt portion 23 is wound around the rotator SF (the expanded diameter portion 11) and the tension is applied to the belt portion 23. Moreover, for example, when the driving elements 31 and 32 are reduced, the first end portion 21 and the second end portion 22 are separated from each other. For this reason, the belt 23 is separated and relaxed from the rotator SF.

The expansion and contraction of the driving elements 31 and 32 of the driving substrate DS is transmitted to the connection portions 24A and 24B of the transmission substrate TS via the movable portions 41 and 42 and the connection member CN, and is transmitted to the belt portion 23 as the driving force that moves the first end portion 21 and the second end portion 22. In this manner, the driving substrate DS and the transmission substrate TS are connected to each other such that the driving force due to the driving portion AC is transmitted to and acts on the transmission portion BT.

Figure 5A:
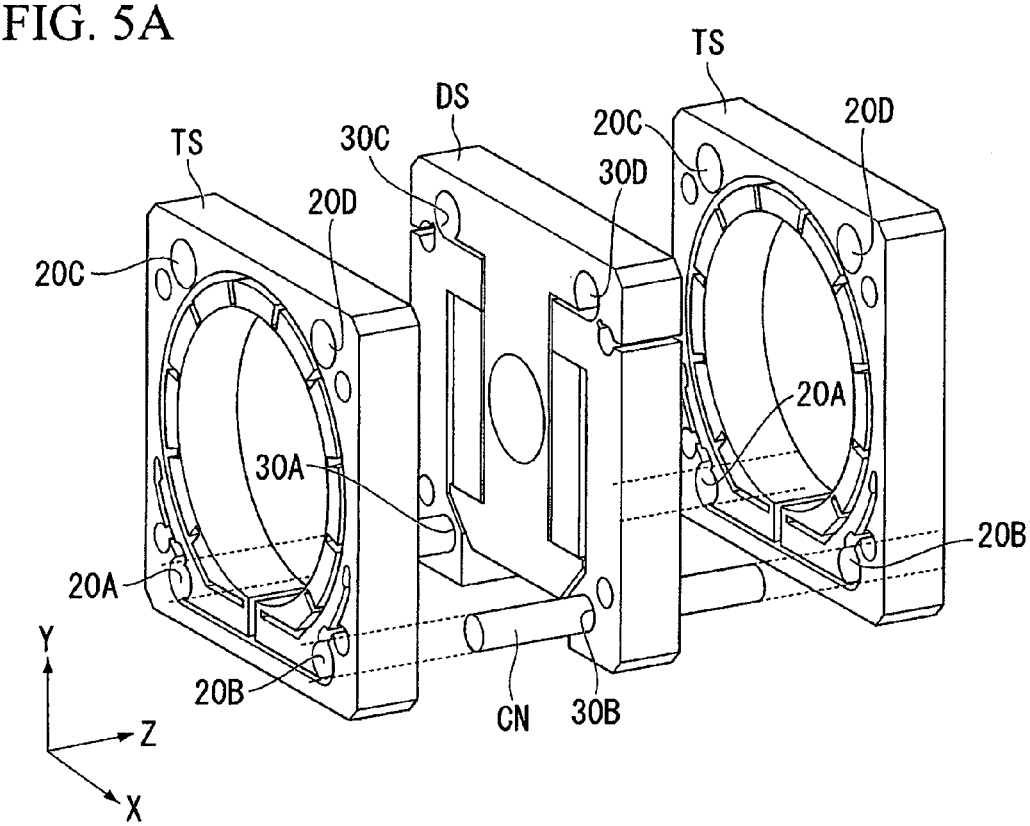
FIG. 5A is a diagram that shows a configuration of part of a motor device according to the present embodiment.
Figure 5B:
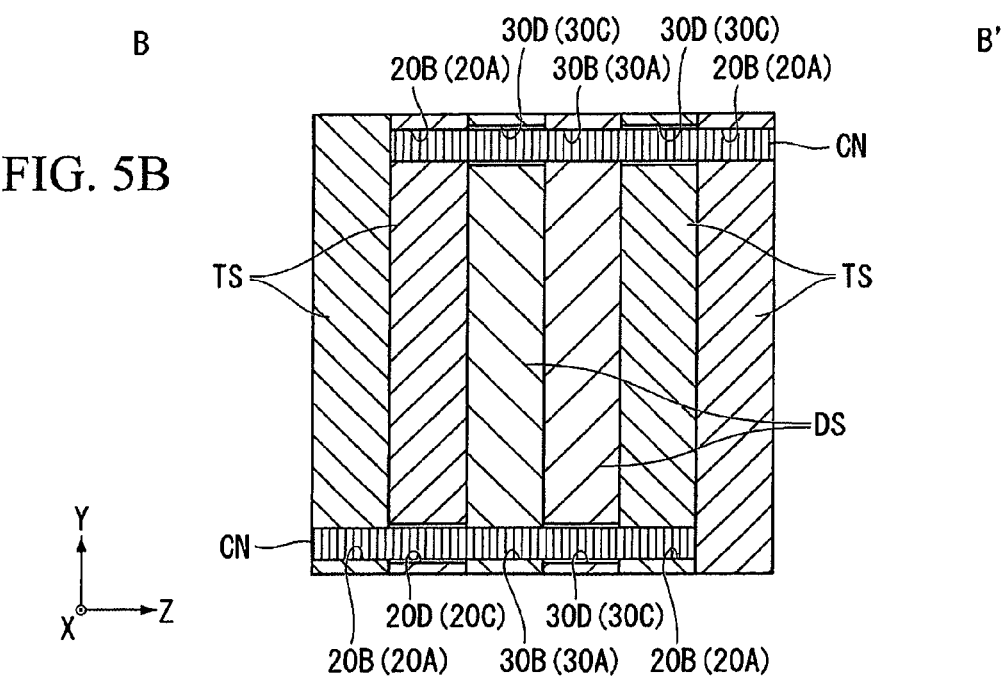
FIG. 5B is a cross-section diagram that shows a configuration of part of a motor device according to the present embodiment.

FIG. 5A is a diagram that shows a configuration of part of the motor device MTR of the present embodiment. FIG. 5B is a diagram that shows a configuration along B-B section in FIG. 1. In the present embodiment, there is a configuration in which, as shown in FIG. 5A, two transmission substrates TS are provided in one driving substrate DS, and two transmission substrates TS are disposed so as to interpose the driving substrate DS therebetween in the Z axis direction.

In the present embodiment, for example, as shown in FIGS. 1, 2 and 5B, two groups of the driving substrate DS and two transmission substrates TS are provided, and the Y direction of each group is reversed. Furthermore, each group is disposed so as to shift in the Z axis direction by the thickness (the size in the Z axis direction) of one transmission substrate TS or the driving substrate DS. For this reason, the driving substrates DS of each group are brought into contact with each other, the transmission substrates TS disposed in +Z side with respect to the driving substrate DS are brought into contact with each other, and the transmission substrates TS disposed in the −Z side with respect to the driving substrate DS are brought into contact with each other.

In this case, as shown in FIG. 5B, the connection member CN passing through the opening portions 20A and 30A in one group passes through the opening portions 20C and 30C in the other group. Similarly, the connection member CN passing through the opening portions 20B and 30B in one group passes through the opening portions 20D and 30D in the other group. In the configuration of the present embodiment, the opening portions 20C and 30C and the opening portions 20D and 30D are formed to have diameters larger than those of the opening portions 20A and 30A and the opening portions 20B and 30B, respectively, and the connection member CN is provided so that it can be moved within the opening portions. For this reason, the driving operations in each group do not interfere with each other.

Next, the driving operation of the rotator SF will be described.

In the motor device MTR according to the present embodiment, the principal of driving the rotator SF will be described. Upon driving the rotator SF, an effective tension is generated in the transmission portion BT wound around the rotator SF, and the torque is transmitted to the rotator SF by effective tension.

When a tension T1 of the first end portion 21 side of the transmission portion BT wound around the rotator SF and a tension T2 of the second end portion 22 side of the transmission portion BT wound around the rotator SF satisfies the following [Equation 1] by Euler's frictional belt theory, the frictional force is generated between the transmission portion BT and rotator SF, and the transmission portion BT is moved together with the rotator SF in a state (a rotational force transmission state) in which the transmission portion BT does not slip with respect to the rotator SF. By the movement, the torque is transmitted to the rotator SF. However, in [Equation 1], μ is an external frictional coefficient between the transmission portion BT and the rotator SF, and θ is an efficient winding angle of the transmission portion BT.

$$T_1 = T_2 \cdot e^{\mu\theta} \qquad \text{[Equation 1]}$$

At this time, the effective tension contributing to the transmission of the torque is indicated by (T1−T2). When the effective tension (T1−T2) is obtained based on the [Equation 1], [Equation 2] is provided. [Equation 2] is an equation that indicates the effective tension using T1.

$$T_1 - T_2 = (e^{\mu\theta} - 1/e^{\mu\theta}) \cdot T_1 \qquad \text{[Equation 2]}$$

Figure 6:
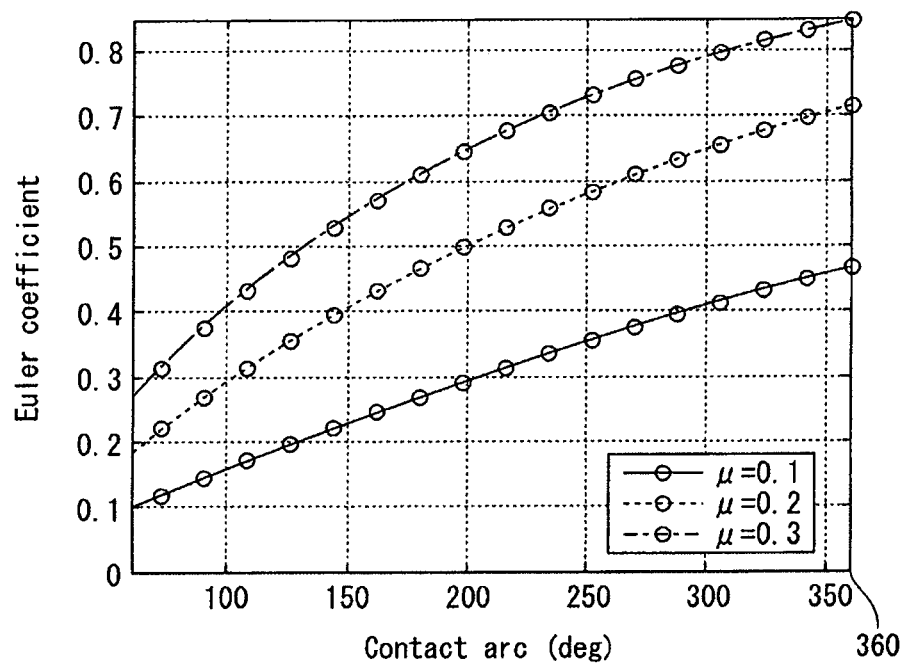
FIG. 6 is a graph that shows a property of a motor device according to the present embodiment.

From [Equation 2], it can be understood that the torque to be transmitted to the rotator SF is arbitrarily determined by the tension T1 of the driving element 31. A coefficient portion of T1 of the right side of [Equation 2] depends on the frictional coefficient μ between the transmission portion BT and the rotator SF and the efficient winding angle θ of the transmission portion BT. FIG. 6 is a graph that shows a relationship between the efficient winding angle θ when the frictional coefficient μ is changed and the value of the coefficient portion. A transverse axis of the graph indicates the efficient winding angle θ and a longitudinal axis of the graph indicates the value of the coefficient portion.

As shown in FIG. 6, for example, in a case where the frictional coefficient μ is 0.3, the value of the coefficient portion is greater than or equal to 0.8 when the efficient winding angle θ is greater than or equal to 300°. From this, it is understood that, when the frictional coefficient μ is 0.3, by setting the efficient winding angle θ to be greater than or equal to 300°, the force of 80% or more of the tension T1 due to the driving element 31 contributes to the torque of the rotator SF. In addition to the winding angle, from the graph of FIG. 6, it is estimated that the larger the frictional coefficient between the transmission portion BT and the rotator SF, the larger the value of the coefficient portion.

In this manner, it is understood that the size of the torque is arbitrarily determined by the tension T1 of the driving element 31 and is substantially not related to, for example, the movement distance or the like of the transmission portion BT. Thus, for example, a piezo element or the like used in the driving element 31 and the driving element 32 can generate the force of several hundreds of Newtons or more even in a small element of around several millimeters, and thus can apply a very large rotational force.

Figure 7:
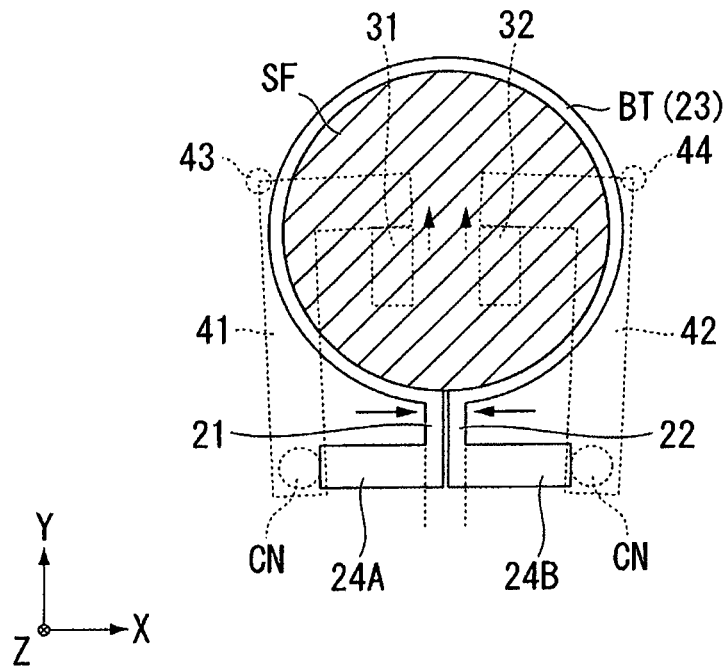
FIG. 7 is a diagram that shows an operation of a motor device according to the present embodiment.

Based on the principle, as shown in FIG. 7, the control device CONT firstly deforms the driving element 31 and the driving element 32 so that the first end portion 21 is moved in the +X direction and the second end portion 22 is moved in the −X direction. By this operation, the tension T1 is generated in the first end portion side 21 of the transmission portion BT, and the tension T2 is generated in the second end portion side 22 of the transmission portion BT. Thus, the effective tension (T1−T2) is generated in the transmission portion BT.

Figure 8:
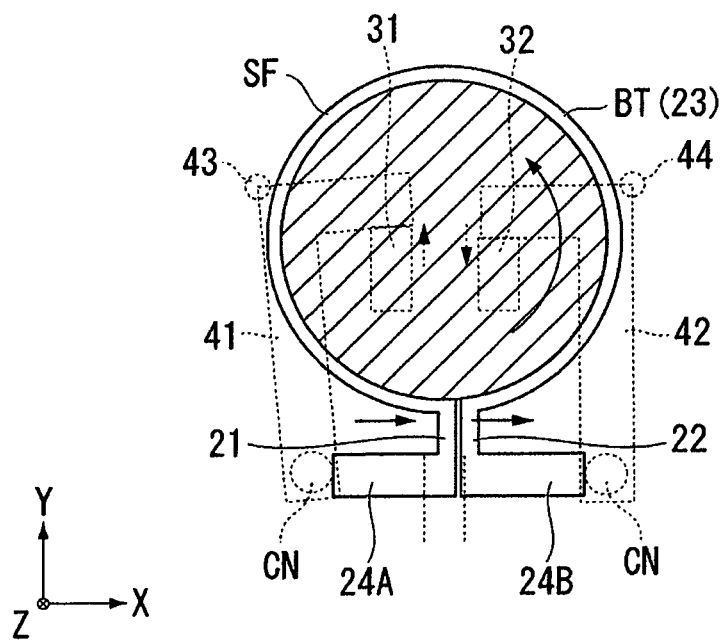
FIG. 8 is a diagram that shows an operation of a motor device according to the present embodiment.

The control device CONT deforms the driving element 31 and the driving element 32 so that, as shown in FIG. 8, the first end portion 21 of the transmission portion BT is moved in the +X direction and the second end portion 22 is moved in the +X direction while maintaining the state of generating effective tension in the transmission portion BT (a driving operation).

In the operation, the control device CONT makes the movement distance of the first end portion 21 equal to the movement distance of the second end portion 22. By this operation, the transmission portion BT is moved in a state in which the frictional force is generated between the transmission portion BT and the rotator SF, and the rotator SF is rotated in the AZ direction along with the movement.

In the present embodiment, the frictional coefficient μ between the transmission portion BT and the rotator SF is, for example, 0.3, and the transmission portion BT is wound around the rotator SF by substantially one rotation (360°). Thus, referring to the graph of FIG. 6, the force of about 85% of the tension T1 of the driving element 31 is transmitted to the rotator SF as the torque.

Figure 9:
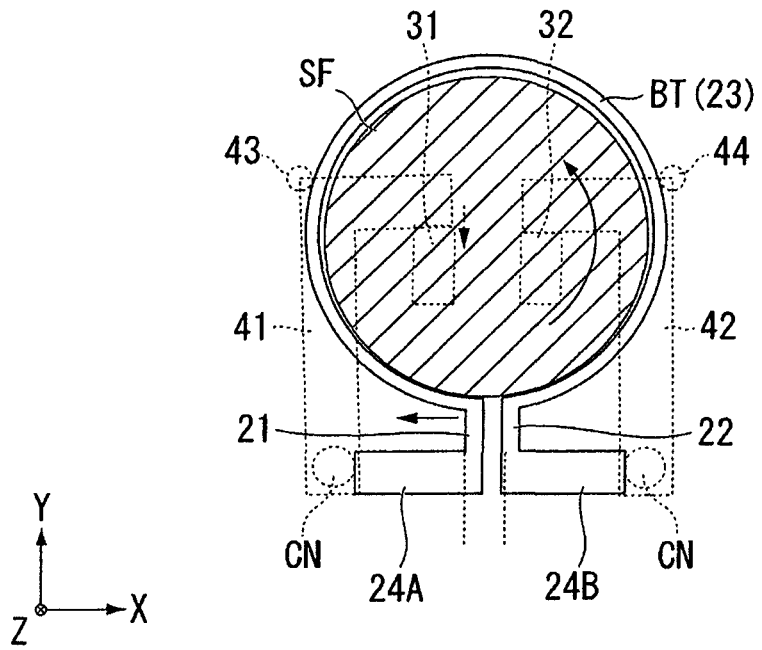
FIG. 9 is a diagram that shows an operation of a motor device according to the present embodiment.

The control device CONT moves the first end portion 21 and the second end portion 22 by a predetermined distance, and then as shown in FIG. 9, deforms only the driving element 31 so that the first end portion 21 returns to a start position (a predetermined position) of the driving and the second end portion 22 is not moved. By this operation, the first end portion 21 is moved in the −X direction, and the winding of the transmission portion BT enters a loosened state. That is, the effective tension applied to the transmission portion BT is released. In this state, the frictional force is not generated between the transmission portion BT and the rotator SF, and the rotator SF continues to rotate due to inertia.

Figure 10:
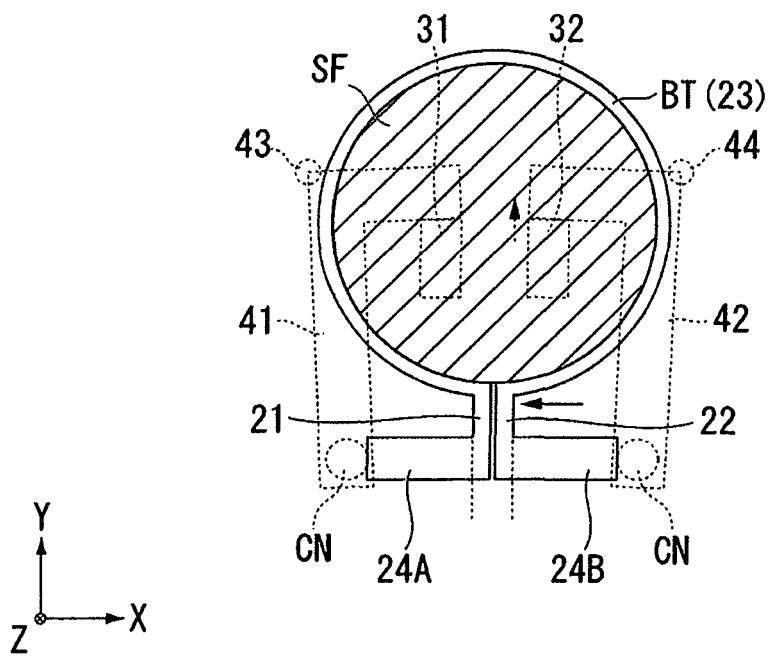
FIG. 10 is a diagram that shows an operation of a motor device according to the present embodiment.

The control device CONT loosens the winding of the transmission portion BT, and then, as shown in FIG. 10, deforms the driving element 32 so that the second end portion 22 returns to the start position (a predetermined position) of the driving. By this operation, in a state in which the winding of the transmission portion BT is loosened, that is, in a state in which the effective tension is not generated, the second end portion 22 of the transmission portion BT returns to the start position (a predetermined position) of the driving.

Immediately before the second end portion 22 returns to the driving start position, the control device CONT deforms the driving element 31 and moves the first end portion 21 in the +X direction. By this operation, at substantially the same time the second end portion 22 returns to the driving start position, the tension T1 is generated in the first end portion 21 side of the transmission portion BT wound around the rotator SF, and the tension T2 is generated in the second end portion 22 side of the transmission portion BT wound around the rotator SF. As a result, a state (state of FIG. 7) is obtained in which the effective tension is added to the transmission portion BT at the time of the driving start.

After the effective tension is added to the transmission portion BT, the control device CONT deforms the driving element 31 so that the first end portion 21 of the transmission portion BT is moved in the +X direction and deforms the driving element 32 so that the second end portion 22 of the transmission portion BT is moved in the +X direction (driving operation). At this time, the movement distance of the first end portion 21 is made equal to the movement distance of the second end portion 22. By this operation, the transmission portion BT is moved in a state in which the frictional force is generated between the transmission portion BT and the rotator SF, and the rotator SF is rotated in the θZ direction together with the movement.

After that, the control device CONT releases the effective tension which is added to the transmission portion BT again. The control device CONT moves the transmission portion BT so that first end portion 21 and the second end portion 22 thereof return to the start position after releasing the effective tension in the manner of FIG. 9 (a return operation). In this manner, the control device CONT causes the driving operation and the return operation to be repeatedly performed in the driving portion AC, whereby the rotator SF continues to rotate in the θZ direction.

Next, the manufacturing method of the motor device MTR will be described.

Figure 11:
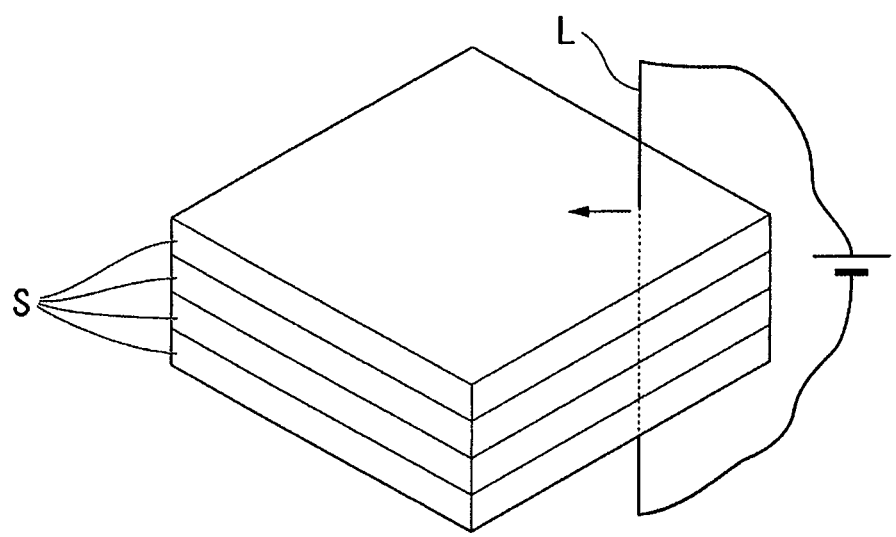
FIG. 11 is a diagram that shows a manufacturing process of a motor device according to the present embodiment.

When manufacturing the motor device MTR, first, the transmission substrates TS and the driving substrates DS are formed. For example, as shown in FIG. 11, multiple substrates S are stacked, and the substrates S are arranged, cut, and formed. For example, a voltage is applied to a metallic linear member L such as a wire and is electrically discharged, and a cutting process is performed on the substrates S in a manner of a jig saw, while causing relative movement between the wire and the substrates S. The cutting process is performed, for example, in the formation of the transmission substrate TS and the formation of the driving substrate DS.

Furthermore, in addition to the above, molds of the transmission substrate TS and the driving substrate DS may be formed and the substrates may be formed by casting. Furthermore, the substrates may be formed by extrusion molding using an extrusion mold of the transmission substrate TS and the driving substrate DS. Furthermore, the transmission substrate TS and the driving substrate DS may be formed by patterning using a photolithography method. After forming the transmission substrate TS and the driving substrate DS, the driving portion AC is attached to the driving base portion 45 of the driving substrate DS, and the transmission substrate TS and the driving substrate DS are connected to each other as above, whereby the motor device MTR is completed.

In this manner, according to the present embodiment, since the driving portion AC performs the driving operation and the return operation in the state in which the transmission portion BT is wound around at least part of the rotator SF, by Euler's frictional belt theory, the torque is arbitrarily determined by one tension applied to transmission portion BT. Thus, even when a reduction gear or the like is not attached, and even in a small driving portion AC, it is possible to apply high torque to the rotator SF. As a result, it is possible to obtain a small motor device MTR capable of generating high torque. Furthermore, even in a small driving portion AC, it is possible to rotate the rotator SF with high efficiency. Furthermore, according to the present embodiment, it is possible to control the torque of the motor device MTR.

Furthermore, according to the present embodiment, since the transmission portion BT is formed in the transmission substrate TS, the driving portion AC is formed in the driving substrate DS, and the transmission substrate TS and the driving substrate DS are connected to each other so that the driving force due to the driving portion AC acts on transmission portion BT, it is possible to manufacture at low cost and by a simple manufacturing process. Furthermore, since the transmission substrate TS and the driving substrate DS are provided as the same type of substrate, a motor device MTR is provided having superior handling properties during attachment and detachment to the rotator SF, during carriage (transportation), during storage or the like.

[Second Embodiment]

Next, a second embodiment of the present invention will be described.

The present embodiment is different from the first embodiment in that an elastic deformation of the transmission portion BT is used at the time of operation of the motor device MTR. Thus, regarding a configuration of the motor device MTR, it is possible to use the same configuration as the first embodiment except that the transmission portion BT is elastically deformable.

In the present embodiment, a spring constant of the transmission portion BT is set as k. Herein, by Euler's frictional belt theory, a retention $T_C$ of the rotator SF is set as the following [Equation 3]. The retention $T_C$ is the force needed to start to move the stopped rotator SF. Furthermore, if a target tension of the first end portion 21 side of the transmission portion BT is set as $T_{1e}$, a target tension of the second end portion 22 side of the transmission portion BT is set as $T_{2e}$, and a target effective tension is set as $T_{goal}$, the hereinbelow [Equation 4] and [Equation 5] are satisfied.

$$T_c = (T_{1e} + T_{2e})/2 \quad \text{[Equation 3]}$$

$$T_{1e} + T_{goal} \cdot e^{\mu\theta}/(e^{\mu\theta}-1) \quad \text{[Equation 4]}$$

$$T_{2e} = T_{goal}/(e^{\mu\theta}-1) \quad \text{[Equation 5]}$$

Hereinafter, the driving operation of the rotator SF will be described in priority based on FIGS. 12 to 17. In the present embodiment, in order to facilitate the description, the configuration of the motor device is schematically shown. Thus, for example, in a winding angle of the transmission portion BT or the like, there is difference from the actual configuration in drawing. In addition, in FIGS. 12 to 17, the description will be made such that in the first end portion 21, the right side in the drawings is in the +X direction, and in the second end portion 22, the left side in the drawings is in the +X direction. Furthermore, in FIGS. 12 to 17, the driving elements 31 and 32 are omitted.

In the following description, the positions of the first end portion 21 and the second end portion 22 of the transmission portion BT, which enters the state in which transmission portion BT is wound around the rotator SF by one rotation without applying the tension to the transmission portion BT, are set to a starting point position 0. Thus, in a state in which both the first end portion 21 and the second end portion 22 of the transmission portion BT are disposed in the starting point position 0, frictional force is not generated between transmission portion BT and the rotator SF.

<Driving Operation>

Figure 12:
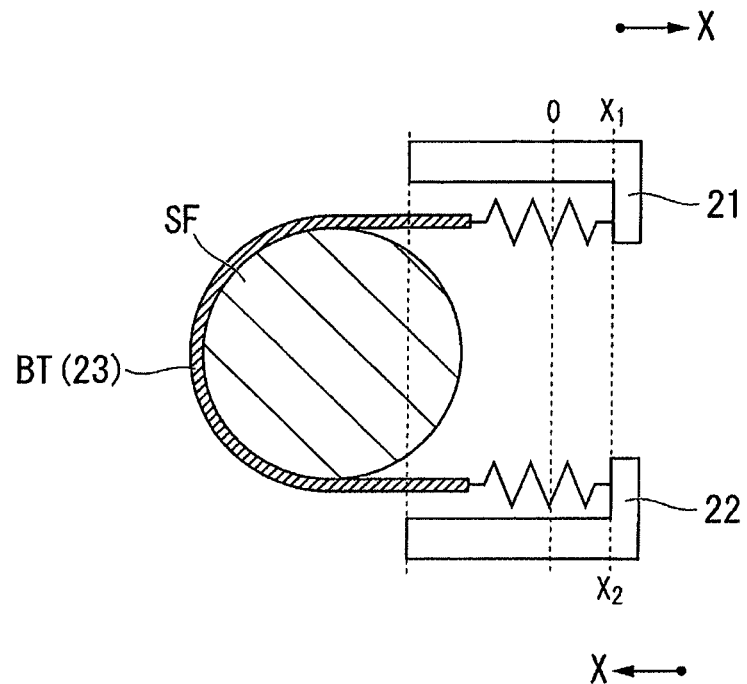
FIG. 12 is a diagram that shows an operation of a motor device according to a second embodiment of the present invention.

Firstly, as shown in FIG. 12, the control device CONT deforms the driving element 31 such that the first end portion 21 of the transmission portion BT is moved from the starting point position 0 to $X_1$ in the +X direction (the right side of FIG. 12). Furthermore, the control device CONT deforms the driving element 32 such that the second end portion 22 of the transmission portion BT is moved from the starting point position 0 to $X_2$ in the −X direction (the right side of FIG. 12). The state is called an initial state of the driving operation. At this time, $X_1$ and $X_2$ satisfy the following [Equation 6].

$$x_1 = x_2 = T_c/K \quad \text{[Equation 6]}$$

K: spring constant of a belt.

Figure 13:
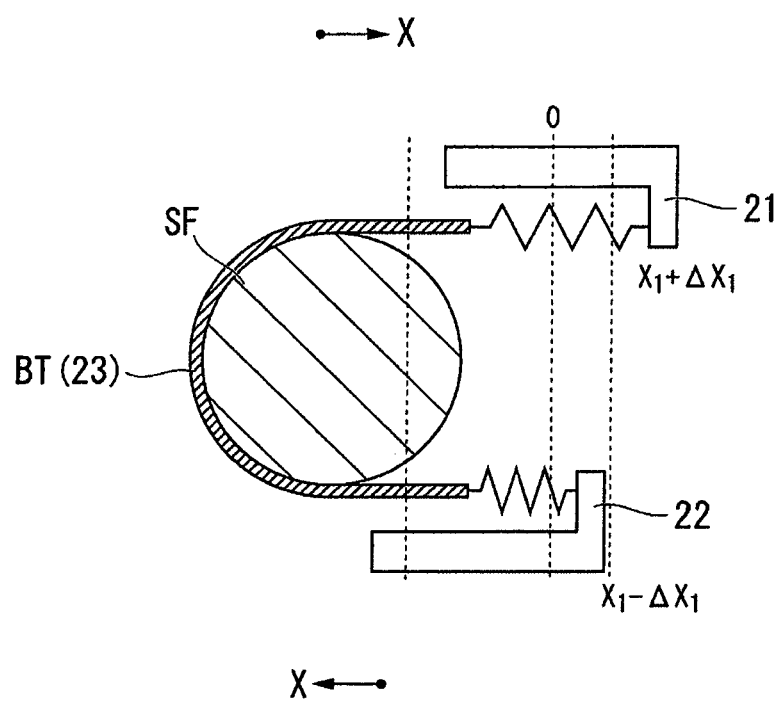
FIG. 13 is a diagram that shows an operation of a motor device according to the present embodiment.

From this state, as shown in FIG. 13, the control device CONT deforms the driving element 31 and causes the first end portion 21 to move $\Delta X_1$ in the +X direction (the right side of FIG. 13) so that the tension T1 of the first end portion 21 side of the transmission portion BT becomes the target tension $T_{1e}$. Furthermore, the control device CONT deforms the driving element 32 and causes the second end portion 22 to move $\Delta X_2$ in the +X direction (the left side of FIG. 13) so that the tension T2 of the second end portion 22 side B becomes the target tension $T_{2e}$. By this operation, the torque is transmitted from the transmission portion BT to the rotator SF. At this time, $\Delta X_1$ satisfies [Equation 7]:

[Equation 7]

$$\begin{aligned}\Delta X_1 &= (T_{1e} - T_c)/K \\ &= (T_{1e} - T_{2e})2K \\ &= T_{goal}/2K\end{aligned} \quad (7)$$

Figure 14:
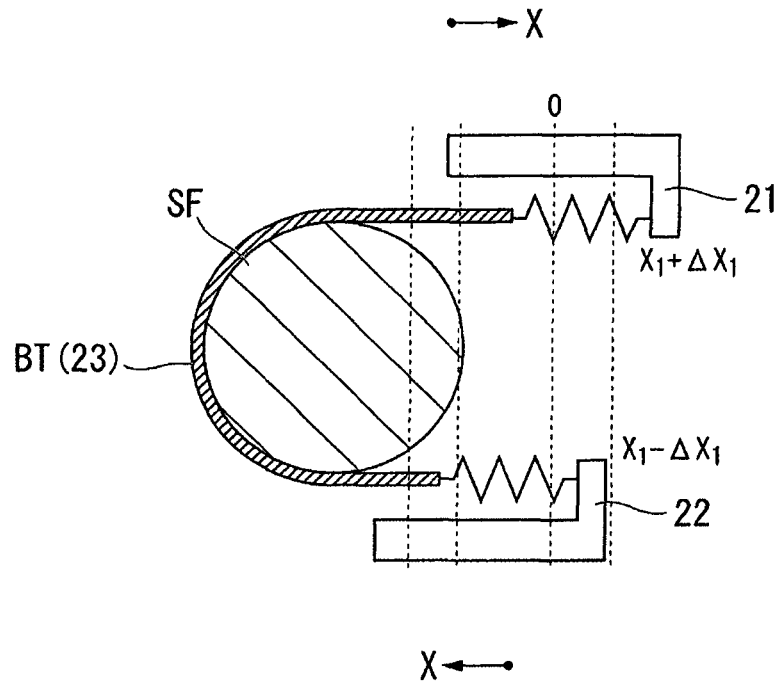
FIG. 14 is a diagram that shows an operation of a motor device according to the present embodiment.

When the torque is transmitted from the transmission portion BT to the rotator SF, the rotator SF is rotated, and the elastic deformation of the transmission portion BT enters the same state as the initial state. As shown in FIG. 14, for this reason, the tension $T_1$ of the first end portion 21 side of the transmission portion BT and the tension $T_2$ of the second end portion 22 side become the retention $T_c$ and are balance out. Since the effective tension at this time is approximately and linearly changed from $T_{goal}$ to zero, the effective tension in practice, which is applied to the transmission portion BT, becomes $T_{goal}/2$. Furthermore, the torque to be transmitted to the rotator SF by the transmission portion BT becomes zero.

<Return Operation>

Figure 15:
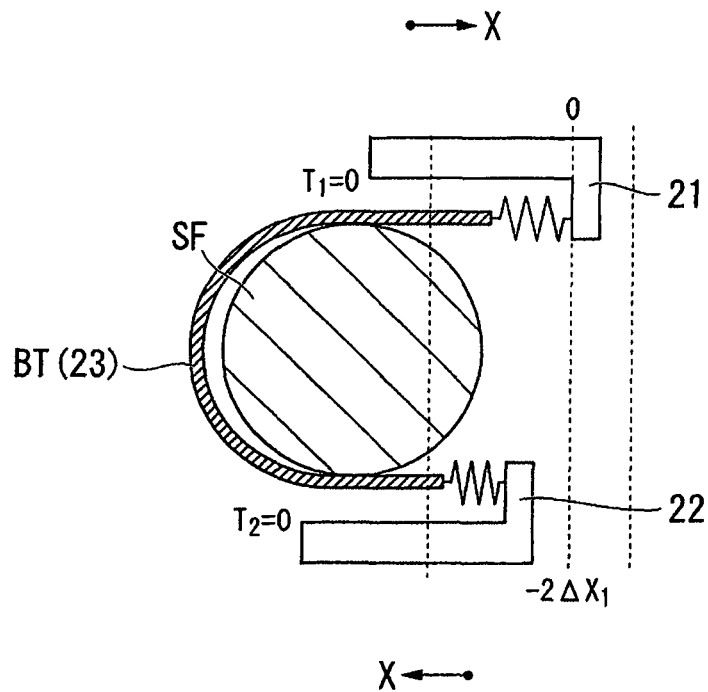
FIG. 15 is a diagram that shows an operation of a motor device according to the present embodiment.

Next, as shown in FIG. 15, the control device CONT simultaneously deforms the driving element 31 and the driving element 32 such that first end portion 21 is moved up to the starting point position 0 and the second end portion 22 is moved from the starting point position 0 further in the +X direction (the left side of FIG. 15). By simultaneously deforming the driving element 31 and the driving element 32, the transmission portion BT loosens (shortens) $2\Delta X_1$, with the result that a gap is generated between the transmission portion BT and the rotator SF. The rotator SF enters an inertial rotation state without receiving the frictional force by the transmission portion BT.

Figure 16:
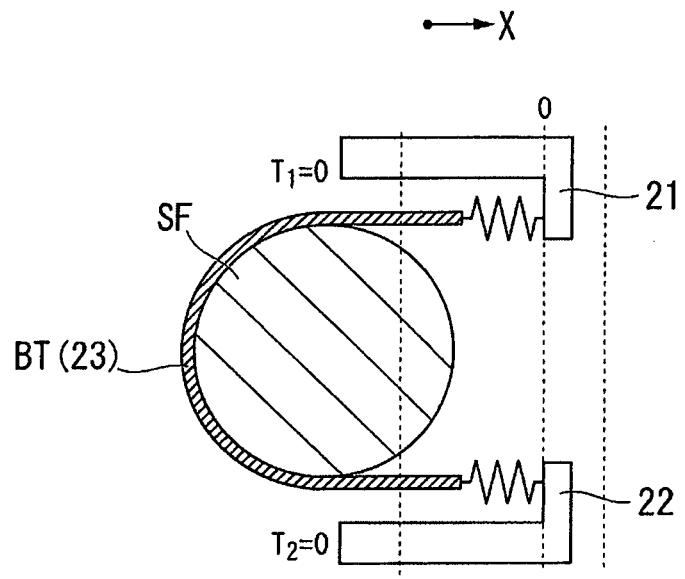
FIG. 16 is a diagram that shows an operation of a motor device according to the present embodiment.

When the gap is generated between the transmission portion BT and the rotator SF, as shown in FIG. 16, the control device CONT deforms the driving element 32 so that, without moving the first end portion 21, only the second end portion 22 returns to the starting point position 0. By this operation, the first end portion 21 and the second end portion 22 return to the starting point position 0. Even in this state, the rotator SF enters the inertial rotation state without receiving the frictional force by the transmission portion BT. In this manner, in the return operation, the first end portion 21 and the second end portion 22 are moved to the starting point position 0 in a state of rotating the rotator SF without providing resistance due to the frictional force to the rotator SF.

<Driving Operation (Inertial Rotation State)>

The control device CONT detects an outer peripheral speed v of the rotator SF by a detector provided in the rotator SF. The control device CONT determines the movement distances of the first end portion 21 and the second end portion 22 based on the detection result. In the driving operation of the state in which the rotator SF is stopped, the initial position of the first end portion 21 is set as $X_1$ and the initial position of the second end portion 22 is set as $X_2$. When the same target effective tension is added to the transmission portion BT in a state in which the rotator SF is in the inertial rotation, the same circumstances as the stopped state of the rotator SF is required. That is, there is a need to set the relative speed between the outer periphery of the rotator SF and the transmission portion BT to zero. For this reason, upon determining the initial position of the first end portion 21 and the initial position of the second end portion 22, there is a need to consider the movement distance per a predetermined time of the outer periphery of the rotator SF. Specifically, the initial position of the first end portion 21 is set as $X_1+v\Delta t$, and the initial position of the second end portion 22 is set as $X_2-v\Delta t$. Herein, for example, $\Delta t$ includes a sampling time or the like of the control device CONT.

Figure 17:
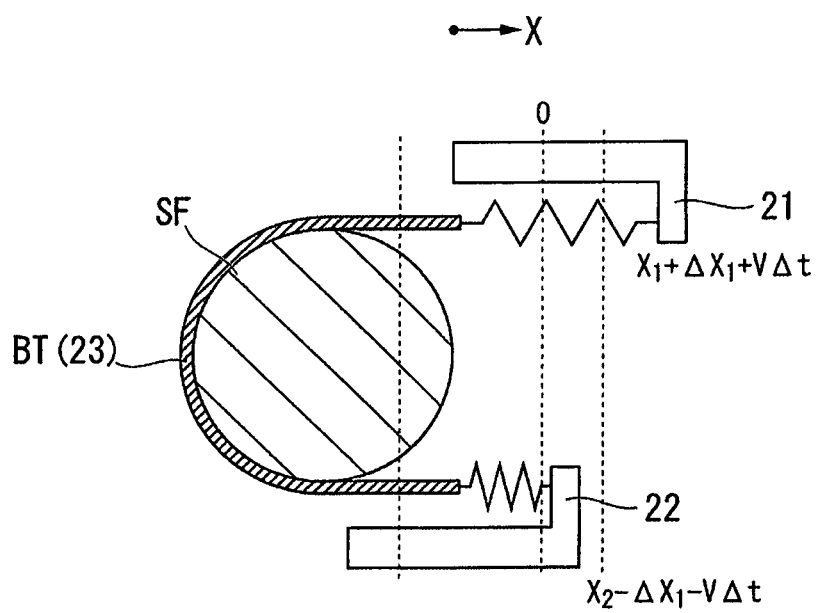
FIG. 17 is a diagram that shows an operation of a motor device according to the present embodiment.

From this state, as shown in FIG. 17, the control device CONT deforms the driving element 31 and causes the first end portion 21 to move $\Delta X_1$ in the +X direction (the right side of FIG. 17) so that the tension T1 of the first end portion 21 side of the transmission portion BT becomes the target tension $T_{1e}$. Furthermore, the control device CONT deforms the driving element 32 and causes the second end portion 22 to move $\Delta X_2$ in the +X direction (the left side of FIG. 17) so that the tension T2 of the second end portion 22 side becomes the target tension $T_{2e}$. By this operation, the torque is transmitted from the transmission portion BT to the rotator SF. The first end portion 21 at this time is moved to $X_1+v\Delta t+\Delta X_1$ with respect to the starting point position 0 in the +X direction (for example, the right side of FIG. 17). Furthermore, the second end portion 22 at this time is moved to $X_2-v\Delta t-\Delta X_1$ with respect to the starting point position 0 in the -X direction (for example, the right side of FIG. 17).

<Return Operation>

Thereafter, the control device CONT simultaneously deforms the driving element 31 and the driving element 32 so that first end portion 21 is moved up to the starting point position 0 and the second end portion 22 is moved from the starting point position 0 in the +X direction (the left side of FIG. 17), and when the gap is generated between the transmission portion BT and the rotator SF, the control device CONT deforms the driving element 32 so that, without moving the first end portion 21, only the second end portion 22 returns to the starting point position 0. By this operation, the first end portion 21 and the second end portion 22 return to the starting point position 0. The return operation can be performed as the same operation without depending on the rotational speed of the rotator SF.

Hereinafter, by repeating the driving operation and the return operation, the rotator SF can be rotated. In a case where the rotator SF is in the inertial rotation state, by repeating the driving operation and the return operation unless the value of $X_1+v\Delta t+\Delta X_1$ exceed a maximum deformation amount of the driving element 31, it is possible to consecutively transmit the torque to the rotator SF.

Next, the torque control in the driving operation of the rotator SF of the present embodiment will be described.

An effective torque $N_e$ in the present embodiment depends on a time $t_{all}$ which is required for performing the driving operation and the return operation in one cycle, a time $t_e$ from the transmission starting of the effective tension to when the rotator SF enters the inertial state, depends on the target effective tension $T_{goal}$, and a radius R of the rotator SF. Specifically, the following [Equation 8] is obtained:

$$N_e = R \cdot T_{goal} \cdot t_e/(2 \cdot t_{all})$$ [Equation 8]

As shown in [Equation 8], as parameters that control the efficient torque $N_e$, three parameters of $t_{all}$, $t_e$ and $T_{goal}$ are adopted. In regard to the time $t_{all}$ of one cycle of the driving operation and the return operation, since there is a case where the driving control of the rotator SF is set to be regular, it is desirable to perform the control of the effective torque $N_e$ by changing the two values of $t_e$ and $T_{goal}$.

In this manner, according to the present embodiment, by setting the relative speed between the outer periphery of the rotator SF and the transmission portion BT to zero using the elastic deformation of the transmission portion BT and repeatedly performing the driving operation which transmits the effective tension of the transmission portion BT to the rotator SF and the return operation which simultaneously moves the first end portion 21 and the second end portion 22 to the inside, the rotator SF can be dynamically rotated while being accelerated or decelerated. Furthermore, it is possible to effectively rotate the rotator SF even in a small driving portion AC.

[Third Embodiment]

Next, a third embodiment of the present invention will be described.

Figure 18:
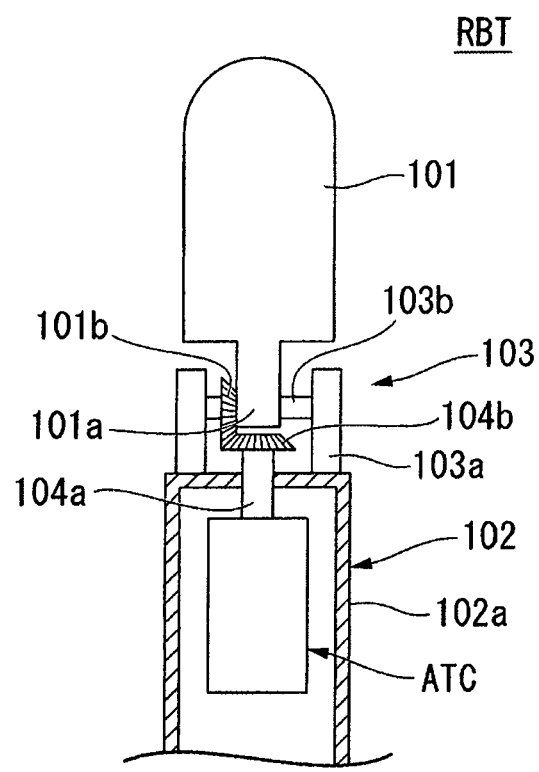
FIG. 18 is a diagram that shows a configuration of a robot hand according to a third embodiment of the present invention.

FIG. 18 is a diagram that shows a configuration of part (a front end of a finger portion) of a robot device RBT which includes the motor device MTR described in the first or second embodiment.

As shown in FIG. 18, the robot device RBT has a configuration which includes a distal joint portion 101, a middle joint portion 102 and an articulation portion 103, and the distal joint portion 101 and the middle joint portion 102 are connected to each other via the articulation portion 103. In the articulation portion 103, a shaft support portion 103a and a shaft portion 103b are provided. The shaft support portion 103a is fixed to the middle joint portion 102. The shaft portion 103b is supported in a state of being fixed to the shaft support portion 103a.

The distal joint portion 101 has a connection portion 101a and a gear 101b. The shaft portion 103b of the articulation portion 103 penetrates the connection portion 101a, and the distal joint portion 101 can rotate using the shaft portion 103b as a rotational shaft. The gear 101b is a bevel gear fixed on the connection portion 101a. The connection portion 101a is integrally rotated with the gear 101b.

The middle joint portion 102 has a case 102a and a driving device ACT. The driving device ACT can use the motor device MTR described in the above-mentioned embodiments. The driving device ACT is provided in the case 102a. A rotational shaft member 104a is attached to the driving device ACT. A gear 104b is provided in the front end of the rotational shaft member 104a. The gear 104b is a bevel gear that is fixed to the rotational shaft member 104a. The gear 104b is engaged with the gear 101b.

In the robot device RBT configured as above, the rotational shaft member 104a is rotated by the driving of the driving device ACT, and the gear 104b is integrally rotated with the rotational shaft member 104a. The rotation of the gear 104b is transmitted to the gear 101b engaged with the gear 104b, whereby the gear 101b is rotated. By the rotation of the gear 101b, the connection portion 101a is rotated, whereby the distal joint portion 101 is rotated around the shaft portion 103b.

In this manner, according to the present embodiment, by mounting the driving device ACT which can output the rotation of a low speed and high torque at a low voltage, the distal joint portion 101 can directly be rotated without using, for example, a reduction gear. Furthermore, in the present embodiment, since the driving device ACT is driven in a non-resonance configuration, it is possible to configure the majority of parts using a light material such as a resin.

The technical scope of the present invention is not limited to the above-mentioned embodiments, but can be suitably changed with a scope which does not depart from the gist of the present invention.

Figure 19:
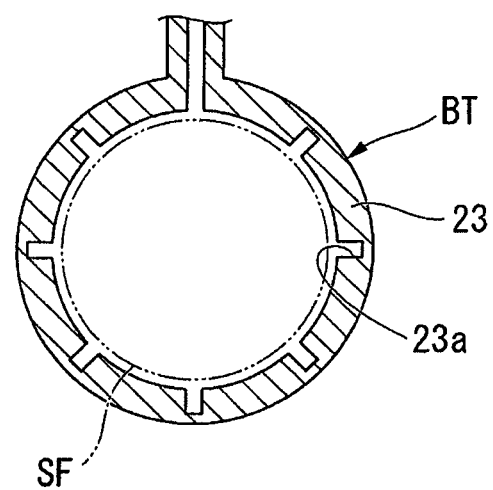
FIG. 19 is a diagram that shows another embodiment of a motor device according to the present invention.

In the above-mentioned embodiments, a configuration was described as an example in which the cutting portion 23a is provided outside the transmission portion BT. However, the present invention is not limited thereto, but for example, as shown in FIG. 19, a configuration may be adopted in which a notch portion is provided inside (the surface that comes into contact with the rotator SF) the transmission portion BT. Furthermore, a configuration may of course be adopted in which the cutting portion 23a is not provided.

Furthermore, for example, in the embodiments, a configuration in which two transmission substrates TS are disposed in one driving substrate DS has been described as one group. However, the present invention is not limited thereto. For example, a configuration may be adopted in which one driving substrate DS and one transmission substrate TS are used as one group. Furthermore, a configuration may be adopted in which the transmission substrates TS of three or more are disposed in one driving substrate DS. A configuration may also be adopted in which one driving substrate DS and one transmission substrate TS are used.

Figure 20:
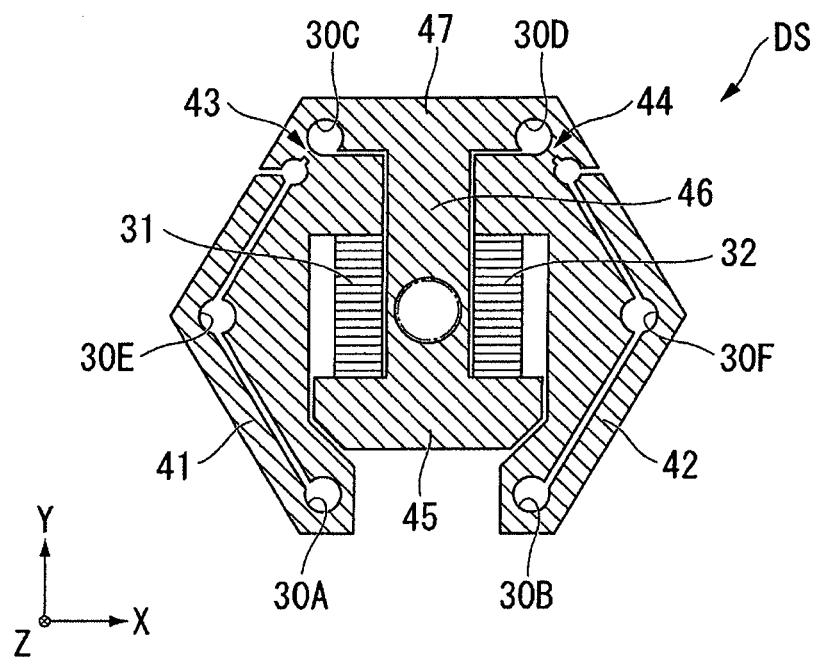
FIG. 20 is a diagram that shows another embodiment of a motor device according to the present invention.
Figure 21:
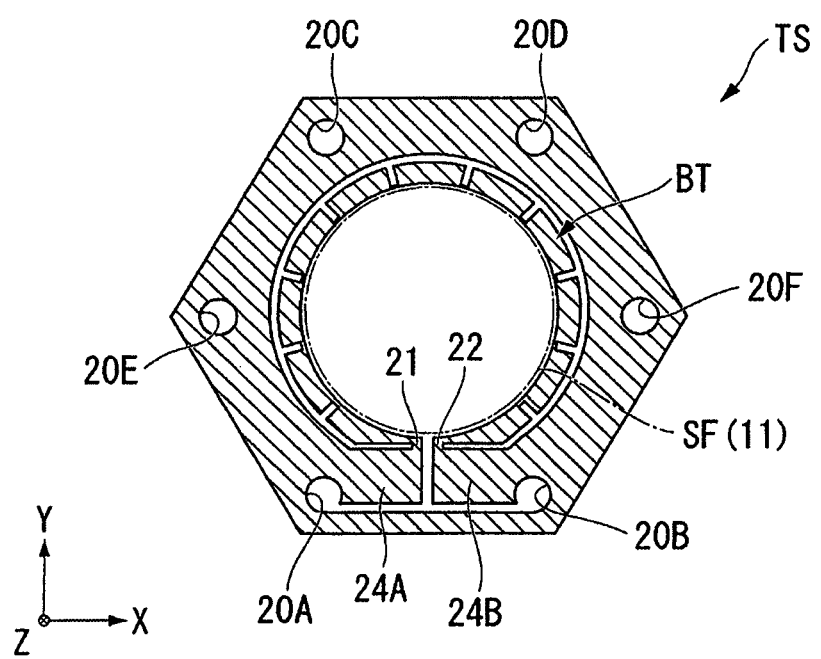
FIG. 21 is a diagram that shows another embodiment of a motor device according to the present invention.

Furthermore, in a case where three groups of the driving substrate DS and the transmission substrate TS are provided, for example, as shown in FIGS. 20 and 21, the driving substrate DS and the transmission substrate TS may be formed in a hexagonal shape when seen in the Z direction. In this case, it is possible to dispose the group of the driving substrate DS and the transmission substrate TS in a deviation position of the rotator SF by 120° for each one phase. Furthermore, it is possible to sequentially drive the phases that are disposed in this manner. In the case of alternately performing the driving in three phases, the vibration width of the tension is suppressed to be small, whereby stable driving can be performed.

Furthermore, the driving substrate DS and the transmission substrate TS are not limited to the square and the hexagon, but may be another shape. For example, a circle or an oval may be adopted, and other shapes may be adopted such as a trapezoid, a parallelogram, a lozenge, a triangle, and a hexagon.

Furthermore, for example, in the above-mentioned embodiments, a case has been described where the rotator is a solid. However, the present invention is not limited thereto, but can be applied to a case of using a rotator formed in a hollow shape (for example, a cylindrical shape). Particularly, as in the third embodiment, in a case where the motor device MTR is mounted on the robot device RBT (for example, the head of the finger portion thereof, the evolution system machine or the like), the wiring or the like can be disposed in an inner portion of the rotator of a cylindrical shape.

Figure 22:
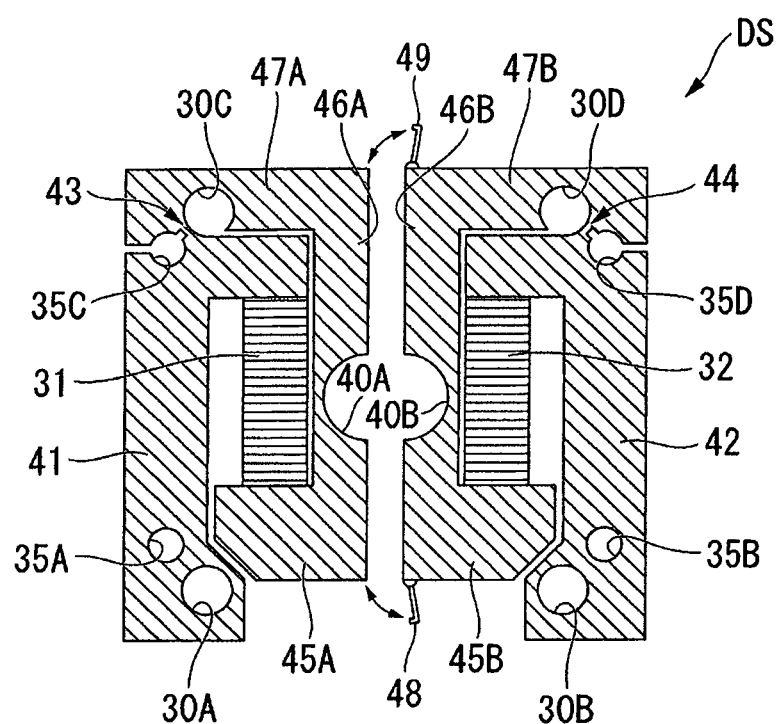
FIG. 22 is a diagram that shows another embodiment of a motor device according to the present invention.

Furthermore, in the above-mentioned embodiment, for example, a case has been described as an example where the driving substrate DS is formed as one member, but as shown in FIG. 22, a configuration may be adopted in which the driving substrate DS is provided in a dividable manner, without being limited thereto. In the configuration shown in FIG. 22, for example, a base portion (a first portion) 47A and a base portion (a second portion) 47B, connection portions (46A and 46B), and holding portions (driving base portions) (45A and 45B) are formed in a divided state. Moreover, in the above-mentioned embodiments, the penetration portions are semi-circular concave portions 40A and 40B. Furthermore, in the driving base portions 45B and the support portion 47B, clamp mechanisms 48 and 49 are provided, respectively. By the clamp mechanisms 48 and 49, the driving base 45A is connected to the driving base portion 45B, and the support portion 47A is connected to the support portion 47B. Using such a configuration, for example, it is possible to obtain a driving substrate DS that is easily attached to the rotator SF. In addition, the configuration shown in FIG. 22 is a configuration in which the driving substrate DS can be divided, but, for example, a configuration may be adopted in which the base portions 47A and 47B are integrally provided and only the driving base portions 45A and 45B side can be separated, without being limited thereto. Furthermore, on the contrary, a configuration may be adopted in which the driving base portions 45A and 45B are integrally provided and only the base portions 47A and 47B can be separated.

What is claimed is:

1. A motor device comprising:
    a transmission substrate formed with a transmission portion that is wound around at least part of an outer periphery of a rotator, the transmission portion having a first end portion and a second end portion; and
    a driving substrate that has a driving portion, connected to the first and second end portions, which acts on at least one of the first and second end portions to move the transmission portion by a certain distance in a state in which the transmission portion is relatively tightly wound around at least part of the outer periphery of the rotator so that a rotational force is transmitted between the rotator and the transmission portion and return the transmission portion to a predetermined position in a state in which the transmission portion is relatively loosely wound around at least part of the outer periphery of the rotator so that the rotation force transmission state is released, and is connected to the transmission substrate so that a driving force due to the driving portion acts on the transmission portion.

2. The motor device according to claim 1,
    wherein the transmission substrate has a first penetration portion where the rotator is inserted, and
    wherein the transmission portion is provided in the first penetration portion.

3. The motor device according to claim 1,
    wherein the transmission portion is formed in an elastically deformable manner.

4. The motor device according to claim 1,
    wherein the transmission portion is formed in a band shape.

5. The motor device according to claim 1, wherein the transmission portion has a groove portion.

6. The motor device according to claim 5,
    wherein a plurality of groove portions is provided all over the transmission portion at substantially equal intervals.

7. The motor device according to claim 2,
wherein the driving substrate has a second penetration portion where the rotator is inserted, and
wherein the driving portion is provided in a position distant from the second penetration portion.

8. The motor device according to claim 7,
wherein the driving portion has a first electromechanical conversion element and a second electromechanical conversion element that are positioned so that the second penetration portion is interposing the first electromechanical conversion element and the second electromechanical conversion element.

9. The motor device according to claim 8,
wherein the first electromechanical conversion element and the second electromechanical conversion element are disposed in positions that are symmetrical in regard to the second penetration portion.

10. The motor device according to claim 8,
wherein the transmission substrate is connected to the driving substrate so that the driving force due to the first electromechanical conversion element acts on the first end portion and the driving force due to the second electromechanical conversion element acts on the second end portion.

11. The motor device according to claim 10,
wherein the first end portion and the second end portion are disposed at positions interposing a standard position on the outer periphery of the rotator therebetween, and
wherein the driving substrates are connected at two positions that interpose at least the first end portion and the second end portion of the transmission substrate therebetween.

12. A robot device comprising:
a rotation shaft member, and
a motor device that rotates the rotation shaft member,
wherein the motor device according to claim 1 is used as the motor device.

13. The motor device according to claim 1,
wherein the transmission substrate and the driving substrate are stacked in line in a rotational axis direction of the rotator.

14. The motor device according to claim 13,
wherein a plurality of transmission substrates and driving substrates are provided, and
wherein the plurality of transmission substrates and driving substrates are alternately stacked in the rotational axis direction.

15. The motor device according to claim 1,
wherein a plurality of transmission substrates is provided, and
wherein the driving substrate is connected to the plurality of transmission substrates.

16. The motor device according to claim 1,
wherein a plurality of transmission substrates is provided, and
wherein the plurality of transmission substrates is disposed so as to deviate in the rotational direction of the rotator by a predetermined angle.

17. The motor device according to claim 1, further comprising:
a connection member that connects the transmission substrate with the driving substrate.

18. The motor device according to claim 1, further comprising:
a substrate positioning portion that positions the transmission substrate and the driving substrate.

19. The motor device according to claim 1,
wherein the rotator is formed in a hollow shape.

20. A motor device comprising:
a transmission substrate formed with a transmission portion that is wound around at least part of an outer periphery of a rotator; and
a driving substrate that has a driving portion which moves the transmission portion by a certain distance in a state in which the transmission portion is relatively tightly wound around at least part of the outer periphery of the rotator so that a rotational force is transmitted between the rotator and the transmission portion and returns the transmission portion to a predetermined position in a state in which the transmission portion is relatively loosely wound around at least part of the outer periphery of the rotator so that the rotation force transmission state is released, and is connected to the transmission substrate so that a driving force due to the driving portion acts on the transmission portion,
the transmission substrate having a first penetration portion where the rotator is inserted,
the transmission portion being provided in the first penetration portion,
the driving substrate having a second penetration portion where the rotator is inserted,
the driving portion being provided in a position distant from the second penetration portion,
the driving portion having a first electromechanical conversion element and a second electromechanical conversion element that are positioned so that the second penetration portion is interposing the first electromechanical conversion element and the second electromechanical conversion element,
the driving substrate having a first portion including the first electromechanical conversion element and a second portion including the second electromechanical conversion element, and
the first portion and the second portion being provided so as to be separable from the driving substrate.

21. A motor device comprising:
a transmission substrate formed with a transmission portion that is wound around at least part of an outer periphery of a rotator, the transmission portion having a first end portion and a second end portion; and
a driving substrate that has a driving portion, connected to the first and second end portions, which acts on at least one of the first and second end portions to move the transmission portion by a certain distance in a state in which a rotational force is transmitted between the rotator and the transmission portion and returns the transmission portion to a predetermined position in a state in which the rotation force transmission state is released, and is connected to the transmission substrate so that the driving force due to the driving portion acts on the transmission portion,
wherein the transmission substrate and the driving substrate are stacked in line in a rotational axis direction of the rotator.

22. A motor device comprising:
a transmission substrate formed with a transmission portion which has a belt that is wound around at least part of an outer periphery of a rotator, the transmission portion having a first end portion and a second end portion; and
a driving substrate that has a driving portion, connected to the first and second end portions, which acts on at least one of the first and second end portions to moves the transmission portion by a certain distance in a state in which a rotational force is transmitted between the rotator and the transmission portion and returns the transmission portion to a predetermined position in a state in which the rotation force transmission state is released, and is connected to the transmission substrate so that the driving force due to the driving portion acts on the transmission portion.

\* \* \* \* \*

UNITED STATES PATENT AND TRADEMARK OFFICE
CERTIFICATE OF CORRECTION

PATENT NO. : 8,441,171 B2
APPLICATION NO. : 13/064544
DATED : May 14, 2013
INVENTOR(S) : Masashi Okada et al.

It is certified that error appears in the above-identified patent and that said Letters Patent is hereby corrected as shown below:

In the Claims:

Column 18, Line 49, In Claim 21, delete "returns" and insert -- return --, therefor.

Column 18, Line 65, In Claim 22, delete "moves" and insert -- move --, therefor.

Column 19, Line 1, In Claim 22, delete "returns" and insert -- return --, therefor.

Signed and Sealed this
Seventeenth Day of September, 2013

Teresa Stanek Rea
*Deputy Director of the United States Patent and Trademark Office*